United States Patent
Kibune

(10) Patent No.: US 8,031,091 B2
(45) Date of Patent: Oct. 4, 2011

(54) RECEPTION CIRCUIT, METHOD OF CREATING AD CONVERTER CONVERSION TABLE OF RECEPTION CIRCUIT, AND SIGNAL TRANSFER SYSTEM

(75) Inventor: Masaya Kibune, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/757,571

(22) Filed: Apr. 9, 2010

(65) Prior Publication Data

US 2010/0194611 A1 Aug. 5, 2010

Related U.S. Application Data

(63) Continuation of application No. PCT/JP2007/069984, filed on Oct. 12, 2007.

(51) Int. Cl.
*H03M 1/06* (2006.01)

(52) U.S. Cl. .......................... 341/118; 341/120; 341/155

(58) Field of Classification Search .................. 341/118, 341/120, 155
See application file for complete search history.

(56) References Cited

U.S. PATENT DOCUMENTS

| | | | |
|---|---|---|---|
| 4,746,902 A | 5/1988 | Tol et al. | |
| 5,771,127 A * | 6/1998 | Reed et al. | 360/51 |
| 6,690,311 B2 * | 2/2004 | Lundin et al. | 341/120 |
| 7,196,645 B2 * | 3/2007 | Bock | 341/120 |
| 7,330,141 B2 * | 2/2008 | Temerinac et al. | 341/120 |

FOREIGN PATENT DOCUMENTS

| | | |
|---|---|---|
| JP | 4-259125 A | 9/1992 |
| JP | 2515784 B2 | 4/1996 |
| JP | 10-079667 A | 3/1998 |
| JP | 10-322205 A | 12/1998 |
| JP | 2000-224080 A | 8/2000 |
| JP | 2003-298953 A | 10/2003 |
| JP | 2003-536342 A | 12/2003 |
| JP | 2007-189535 A | 7/2007 |
| WO | WO 01/99282 A1 | 12/2001 |

* cited by examiner

*Primary Examiner* — Khai M Nguyen
(74) *Attorney, Agent, or Firm* — Arent Fox LLP

(57) ABSTRACT

A reception circuit includes: an AD converter that outputs digital data in accordance with an input signal; a correction circuit that corrects nonlinearity of the AD converter; and an equalization circuit that equalizes the corrected digital data, wherein the correction circuit includes: a conversion table used to convert digital data output from the AD converter; and a correction amount computation circuit that creates the conversion table from the output data of the AD converter and the output of the equalization circuit. The correction amount computation circuit creates the conversion table so that there is no dependence between the ADC output value of the AD converter and the estimation result by the equalization circuit for the ADC output value.

13 Claims, 19 Drawing Sheets

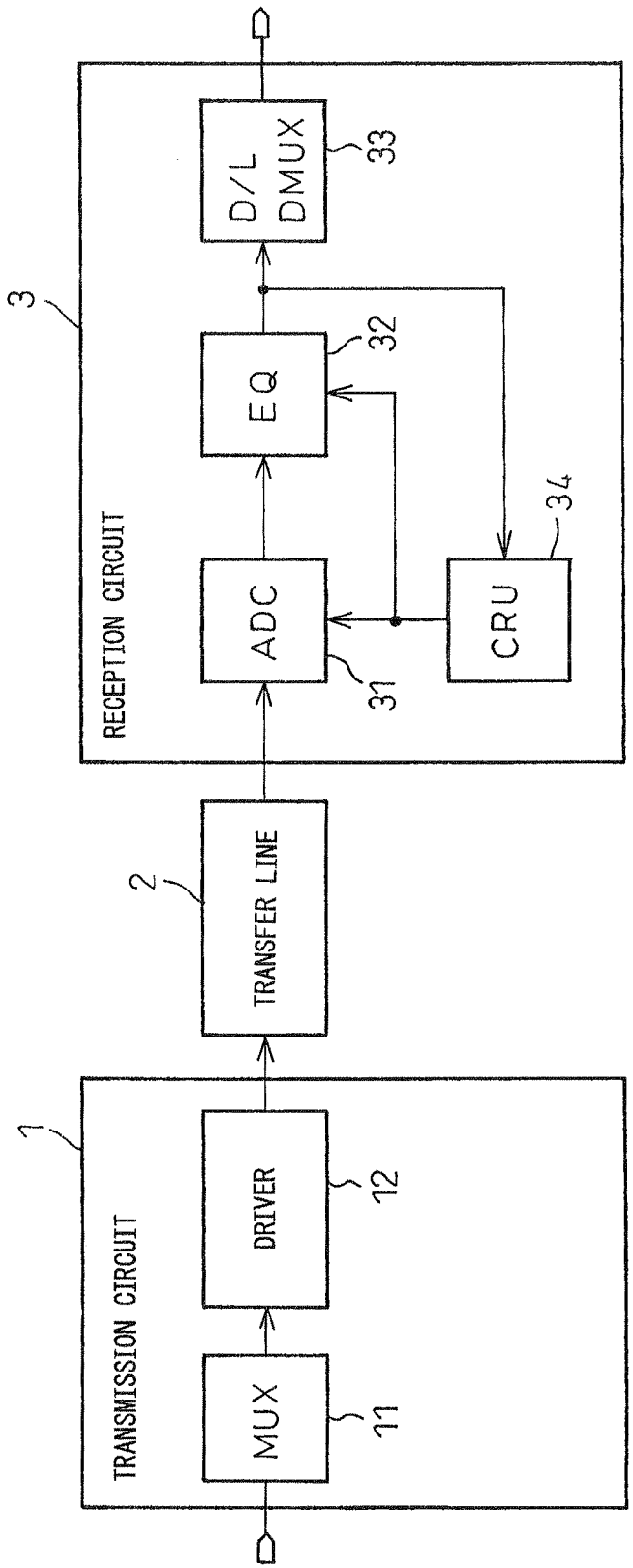

RECEPTION CIRCUIT, METHOD OF CREATING AD CONVERTER CONVERSION TABLE OF RECEPTION CIRCUIT, AND SIGNAL TRANSFER SYSTEM

CROSS-REFERENCE TO RELATED APPLICATIONS

This application is a continuation application and is based upon PCT/JP2007/069984, filed on Oct. 12, 2007, the entire contents of which are incorporated herein by reference.

FIELD

The embodiments discussed herein are related to a transmission/reception system that performs signal transfer between a plurality of circuit blocks within a chip, signal transfer between LSI chips, and signal transfer between boards and between cases, etc., and a reception circuit constituting the system.

BACKGROUND

FIG. 1 is a diagram illustrating a schematic configuration of a high-speed signal transfer system. As illustrated in FIG. 1, the signal transfer system includes a transmission circuit 1, a transfer line 2 and a reception circuit 3. In the transmission circuit 1, low-speed parallel data is converted into serial data in a multiplexer (MUX) 11 and the serial data is output to the transfer line 2 by a driver 12 having an output impedance the same as the characteristic impedance of the transfer line 2. The serial data is input to the reception circuit 3 via the transfer line 2. An input reception waveform received by the reception circuit 3 is deteriorated by the characteristics of the transfer line 2. Specifically, the high-frequency component is lost and the waveform is dulled.

Data to be transmitted is two-value data of "0's" and "1's" (or "−1" and "+1") and when the degree of deterioration through the transfer line 2 is low, the input reception waveform for the serial data indicated by a string of "0's" and "1's" on the lower side is such that as illustrated in FIG. 2A. With this received signal waveform, it is possible to correctly reproduce the received data by setting a threshold level to a level indicated by the broken line and by determining the waveform with a comparator.

However, when the transfer line 2 is long or the frequency of the transmission data is very high, the degree of deterioration through the transfer line 2 is high and the input reception waveform for the serial data indicated by a string of "0's" and "1's" on the lower side is such that as illustrated in FIG. 2B. With such a received signal waveform, it is not possible to correctly reproduce received data by determining the waveform using only one comparator. In order to deal with this, the signal level is detected in accordance with a clock of the received data as illustrated in FIG. 2B and then the received data is reproduced correctly.

Because of this, as illustrated in FIG. 1, the reception circuit 3 samples the received signal (analog waveform) and digitizes the signal using an analog/digital converter (ADC) 31 arranged at the input part. An equalization circuit (EQ) 32 shapes the waveform (equalization processing) so as to compensate for the deterioration of waveform through the transfer line. The received data that is shaped is determined to be "0" or "1" and the determination result is converted from serial data into parallel data by a decision latch/demultiplexer (D/L DMUX) 33. A clock signal is necessary for sampling in the ADC 31 and processing in the equalization circuit 32. A clock recovery unit (CRU) 34 reproduces a data clock from the received data output from the equalization circuit 32. In the circuits to be explained below, the CRU 34 is also provided, however, an explanation is not given for the sake of simplification and it is not illustrated schematically.

FIGS. 3A and 3B are diagrams illustrating a configuration of an embodiment of the equalization circuit 32 called a decision feedback equalizer (DFE). FIG. 3A illustrates a conceptual diagram and FIG. 3B illustrates a specific circuit configuration. If a transfer function of the transfer line 2 is assumed to be H (z) as illustrated in FIG. 3A, adjustment is made so that the transfer function of a DFE 37 is 1−H (z). One sample received signal is H (z) and if the output 1−H (z) of the DFE 37 is added to a received signal H (z) by an adder 35, a signal without deterioration is output as a result and this output is determined by a comparator 36. Due to this, transmission data $d_n$ may be received correctly. Specifically, in order to sequentially correct the influence of the previous sample data, the sample data ahead by one sample is delayed by one sampling period and the sample data ahead by two samples is delayed by two sampling periods, and in this manner, the sample data is delayed sequentially up to that ahead by a certain number of samples and the delayed data is multiplied by a coefficient in accordance with the degree of influence and added to input data.

As illustrated in FIG. 3B, the equalization circuit 32 includes the DFE 37 having a plurality of multipliers $h_n0$ to $h_nm$, a plurality of the adders 35, the comparator 36, a switch 38 that switches between feedback of data having been subjected to equalization processing and feedback of training data, a comparator 39 that binarizes data to be fed back, a plurality of delay units 40 that generate data to be applied to $h_n1$ to $h_nm$ after delaying the binarized feedback data, a subtracter 41 that calculates a difference between the data having been subjected to equalization processing and the binarized feedback data and generates an amount of error $e_n$, and a coefficient update part (e.c. LMS (Least-mean-square)) 42 that updates the coefficients of the multipliers $h_n0$ to $h_nm$ so that the amount of error is small based on the amount of error $e_n$. The multiplier $h_n0$ multiplies the data output from the ADC 31 by a certain coefficient and outputs the data and the multipliers $h_n1$ to $h_nm$ multiply the previous sample data that is delayed by a certain coefficient and output the data, and the data is added by the adder 35.

H (z) is a z function and because of the limitations of hardware, normally, the terms beyond a certain finite term are truncated. As the coefficients of the multipliers $h_n0$ to $h_nm$, the values acquired by applying the LMS algorithm are set here; however, there may be a case where fixed values are set in advance. The coefficients of the multiplier represent the frequency characteristic of the transfer line. The amount of error, which is an input to the coefficient update part 42, is an error from an ideal waveform that remains even after the waveform shaping using the coefficients. The magnitude of the error represents the quality of the shaped waveform.

The equalization circuit is described in, for example, Japanese Laid-open Patent Publication No. 2000-224080, and therefore, no further explanation is provided.

There are various types for the ADC, however, an ADC that may be used generally in high-speed signal transfer as high as Giga bits/sec is limited to a flash type at present. In a flash type ADC, between a high-side reference potential and a low-side reference potential, a resistor string (ladder resistor) is provided and a divided potential, which is the reference potential divided, is generated at the connection node. Each of a plurality of comparators compares a voltage of an input signal (input voltage) with the divided potentials, respectively.

When the input voltage is smaller than a certain divided potential, the output of the comparators located on the upper side of the comparator that makes a comparison with the divided potential is "0" and the comparators located on the lower side of the comparator, including the comparator, is "1", which is a so-called thermometer manner, and when the outputs of the plurality of comparators are encoded by an encoder, a digital output in the binary form in accordance with the level of the input voltage is obtained. For an N-bit ADC without an interpolation technique, $(2^N-1)$ comparators are required.

The input/output characteristics of an ADC are not linear but nonlinear because of variations in the size of its circuit constituent component or in threshold voltage Vth. FIG. 4 is a diagram explaining the nonlinearity of the ADC. When the ADC exhibits the characteristic illustrated by the stepwise solid line, the input/output characteristics are illustrated by the broken line, different from the input/output characteristics illustrated by the alternate long and short dash line.

In order for the equalization circuit to perform equalization processing to correctly receive data, it is necessary for the input/output characteristics of the ADC to include linearity.

One of the reasons for that the input/output characteristics of the ADC include nonlinearity is the offset of the input part. Because of this, the ADC circuit in the conventional example incorporates an offset voltage generation circuit and an offset cancel circuit configured by a switch that operates with a clock in order to alleviate the degree of nonlinearity.

Japanese Laid-open Patent Publication No. 2003-536342 describes a method of correcting nonlinearity by providing a conversion table used to convert an output of an ADC and creating the conversion table based on the already-known calibration signal to be input from a reference signal input terminal.

SUMMARY

According to a first aspect of the embodiment, a reception circuit includes: an AD converter that outputs digital data in accordance with an input signal; a correction circuit that corrects nonlinearity of the AD converter; and an equalization circuit that equalizes the corrected digital data, wherein the correction circuit includes: a conversion table used to convert digital data output from the AD converter; and a correction amount computation circuit that creates the conversion table from the output data of the AD converter and the output of the equalization circuit.

The object and advantages of the embodiment will be realized and attained by means of the elements and combination particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1 a diagram illustrating a schematic configuration of a high-speed signal transfer system;

DESCRIPTION OF EMBODIMENTS

Before describing the embodiments, the problems of the above-mentioned conventional driving methods will be described.

The above-mentioned method of alleviating the degree of nonlinearity by incorporating the offset cancel circuit includes various problems such as (1) variations in manufacture of the offset voltage generation circuit itself, (2) a high-speed operation is difficult because of an increase in load capacitance, and (3) a noise due to a clock, in addition to the difficulty in designing how to distribute the clocks for an ADC operating at high speed that desires clocks. This method also includes a problem that design is made so as to suppress nonlinearity as much as possible by ignoring power consumption because there is no information about a circuit that actually uses an ADC at the time of ADC design and clear specifications may not be obtained at the time of design, and therefore, there used to be a problem that power consumption becomes large.

The method described in Japanese Laid-open Patent Publication No. 2003-536342 desires a calibration signal. Because of this, it is necessary to provide a calibration signal generation circuit. Further, the creation of the conversion table desires a calibration signal of high quality because a process is needed to estimate parameters of a calibration signal that may be identified by infinite parameters and generate a correction signal based on the estimation.

The embodiments solve the above-mentioned problems and correct the nonlinearity of an ADC with high precision.

Figure 5:
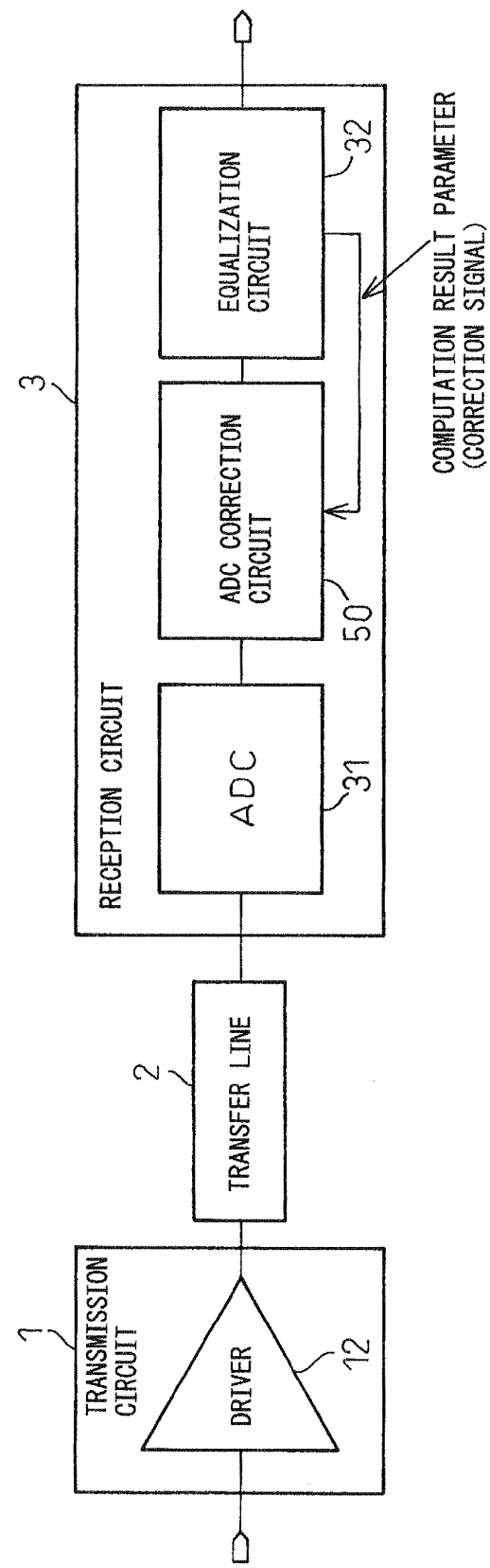
FIG. 5 is a diagram illustrating a basic configuration of a reception circuit of a first embodiment.

FIG. 5 is a diagram illustrating a basic configuration of a signal transfer system of a first embodiment.

As illustrated in FIG. 5, the signal transfer system of the first embodiment includes the transmission circuit 1, the transfer line 2 and the reception circuit 3. The transmission circuit 1 includes the same output impedance as the characteristic impedance of the transfer line 2 and includes the driver 12 that outputs serial data to the transfer line 2. Serial data is input to the reception circuit 3 via the transfer line 2. The reception circuit 3 includes the analog/digital converter (ADC) 31 that samples a received signal (analog waveform) and performs digitization, and the equalization circuit (EQ) 32 that shapes a waveform (equalization processing) so as to compensate for the deterioration of the waveform through the transfer line. The above-mentioned configuration is the same as that in the conventional example in FIG. 1. The signal transfer system of the first embodiment is characterized in that an ADC correction circuit 50 that corrects nonlinearity of the input/output characteristics of the ADC 31 is provided between the ADC 31 and the equalization circuit 32 and the ADC correction circuit 50 creates a conversion table used to correct nonlinearity of the input/output characteristics of the ADC 31 based on the output data of the ADC 31 and the output of the equalization circuit 32.

If it is assumed that the transfer characteristic of the transfer line is linear and its impulse response is $h_0$, the transfer line output, that is, an output $x_n$ of the ADC is expressed by the following expression 1 using a transmission data string $d=\{-1,1\}$ of the transfer line.

$$x_n = h_o d_n + \sum_{i=1}^{M} h_i d_{n-i} \quad (1)$$

For the sake of simplification of explanation, binary signal transfer is illustrated as an example; however, the first embodiment is not limited to this. Data includes "−1" and "+1", however, "0" and "1" may be used.

As illustrated in the expression 1, the impulse response of the transfer line is truncated finitely (1 to M). In the expression 1, the second term indicates the influence of the past data on the current data. This influence is referred to as an intersymbol interference component ISI. This signal is quantized (digitized) by the ADC 31 that includes a noise N and a nonlinear error Er ($x_n$) as a result. Consequently, here, as a signal $y_n$ immediately before quantization, a signal expressed by the following expression 2 is considered.

$$y_n = h_o d_n + \sum_{i=1}^{M} h_i d_{n-i} + Er(x_n) + N \quad (2)$$

N is general random noise and Er ($x_n$) may be regarded as an error static with respect to time. A role of the equalization circuit 32 is to cancel the second term by performing equalization processing on $y_n$ for the quantized value (ADC value).

Figure 2A:
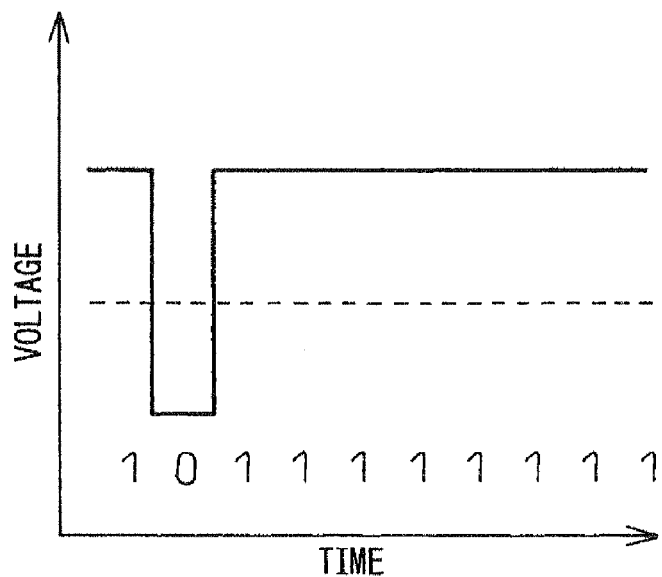
FIGS. 2A and 2B are diagrams explaining the deterioration of a received signal due to transfer and the necessity of an AD converter.
Figure 2B:
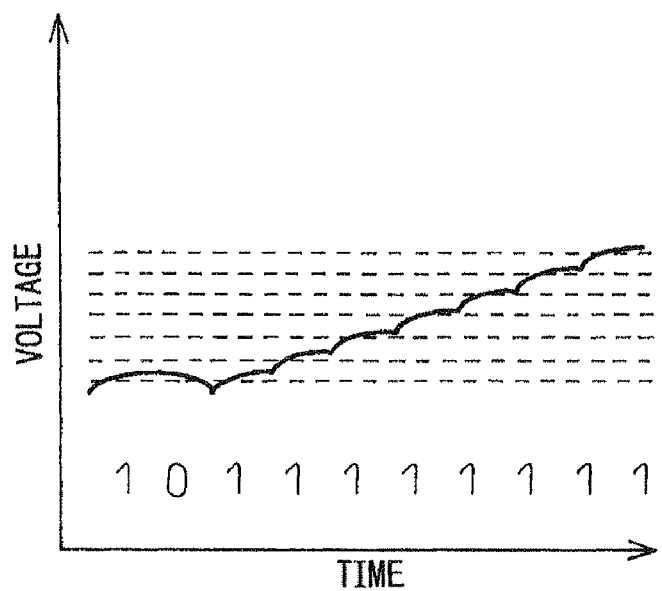
Figure 3A:
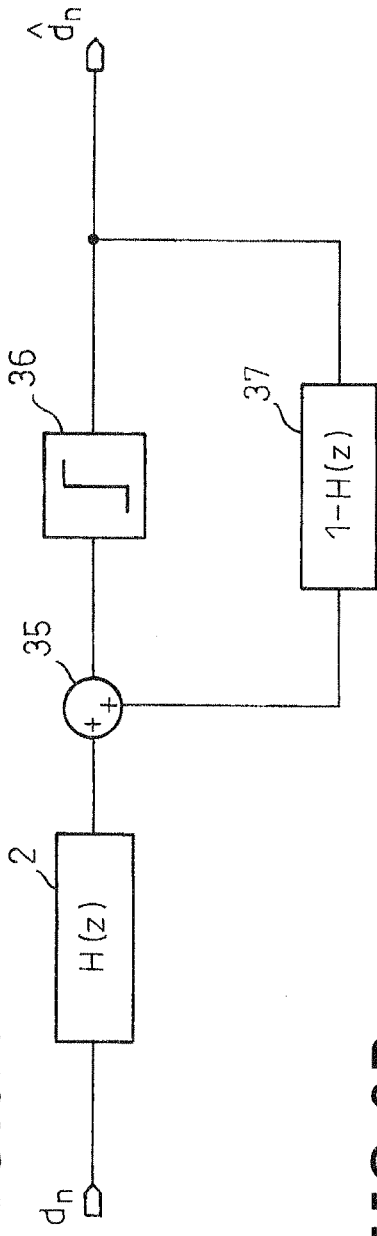
FIGS. 3A and 3B are diagrams illustrating a schematic configuration of an equalization circuit of DFE (Decision Feedback Equalizer) type in a conventional example and a detailed configuration thereof.
Figure 3B:
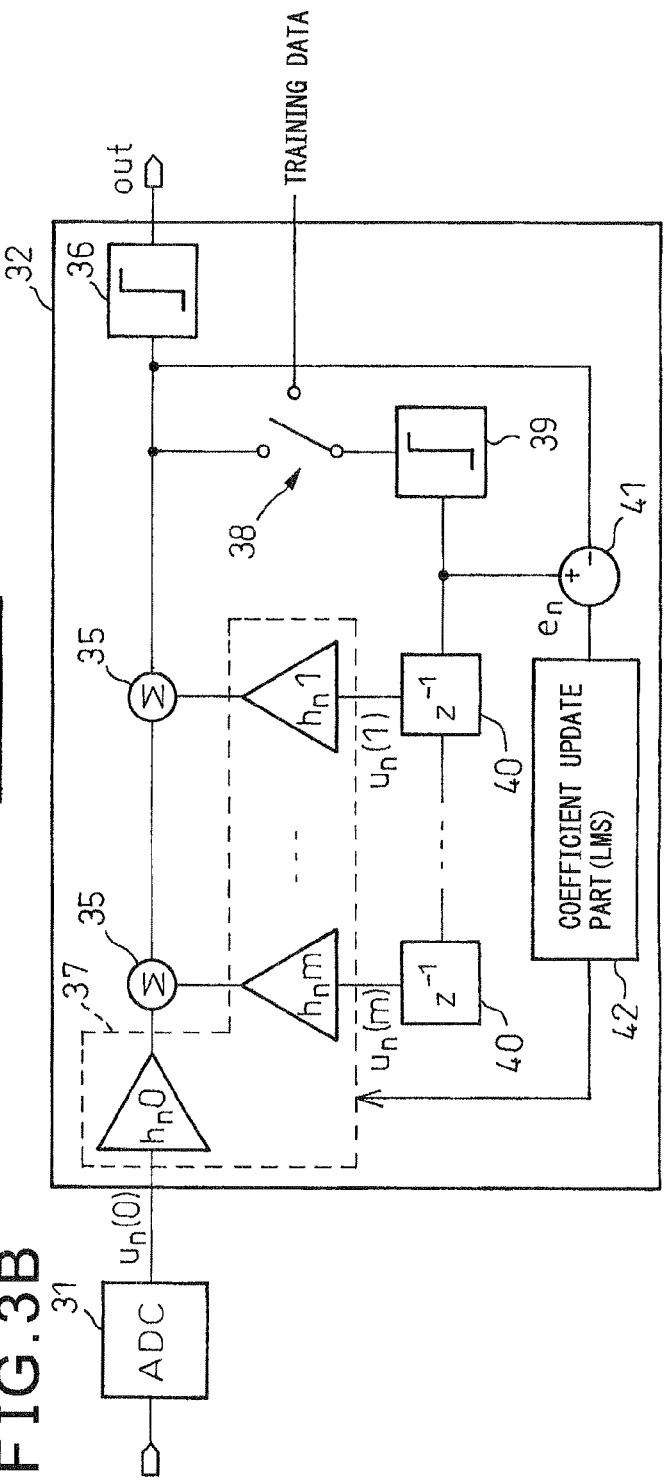

In the first embodiment also, the equalization circuit 32 is realized by the DFE (Decision Feedback Equalizer) in FIGS. 3A and 3B. The DFE restores the output on the side of the reception circuit with the transmission data by estimating and adjusting the characteristics of the DFE so as to be 1−H(z). The estimation of the characteristics of the transfer line is performed by acquiring a certain coefficient $h_n k$ as illustrated in the example in FIG. 3B. As an algorithm to acquire the coefficient, for example, an algorithm to minimize the square of an error of an estimated value, referred to as the "Least Mean Square" algorithm, is used. An amount after the subtraction of ISI is calculated as described above and the calculated value is output to an output node "out". By a determination circuit (comparator) to be connected behind the DFE determining whether the output is "−1" or "+1", the received data is reproduced correctly.

As described above, the residual value (output of DFE) after the subtraction of the ISI component includes no dependence on $x_n$ when the input/output characteristics of the ADC are linear. However, when the input/output characteristics of the ADC are nonlinear, there is a dependence on $x_n$ because of the term of Er ($x_n$).

Figure 4:
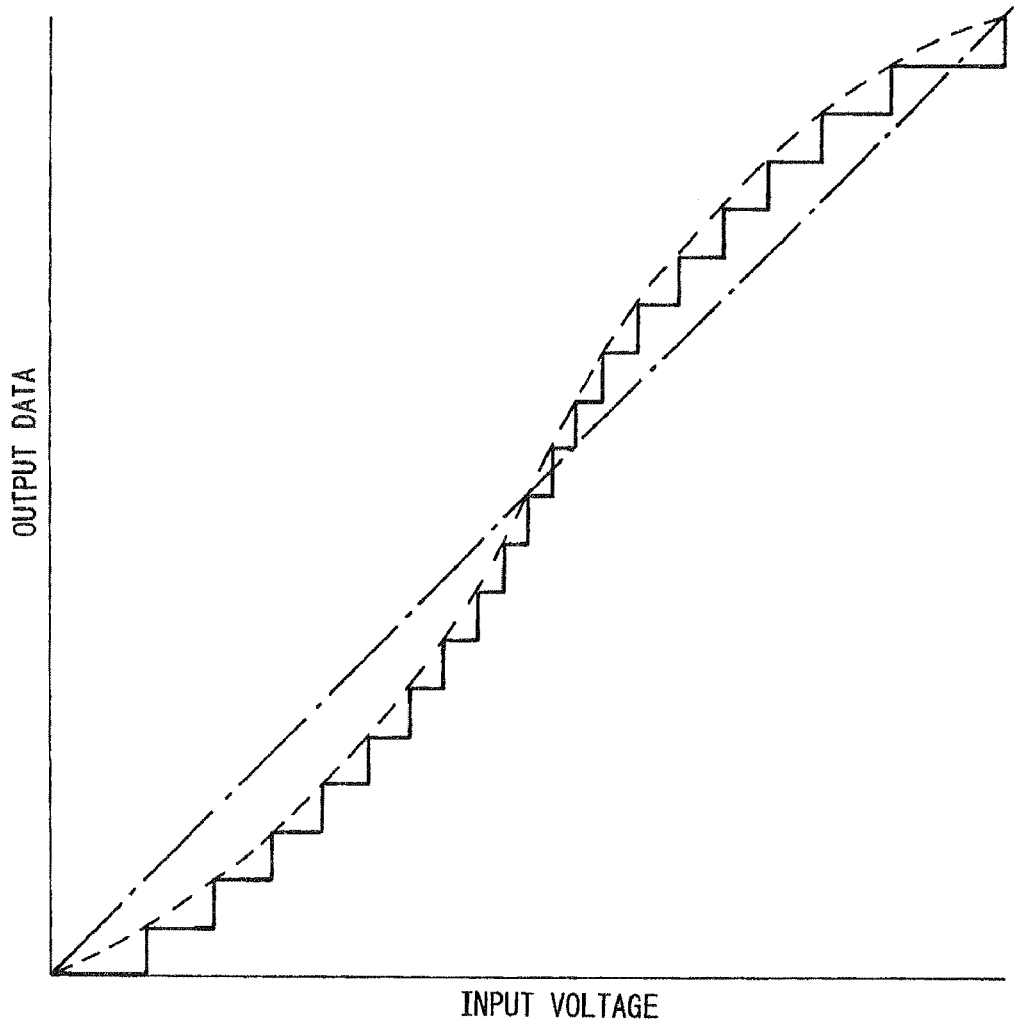
FIG. 4 is a diagram illustrating an example of the input/output characteristics of nonlinearity of an ADC.
Figure 6:
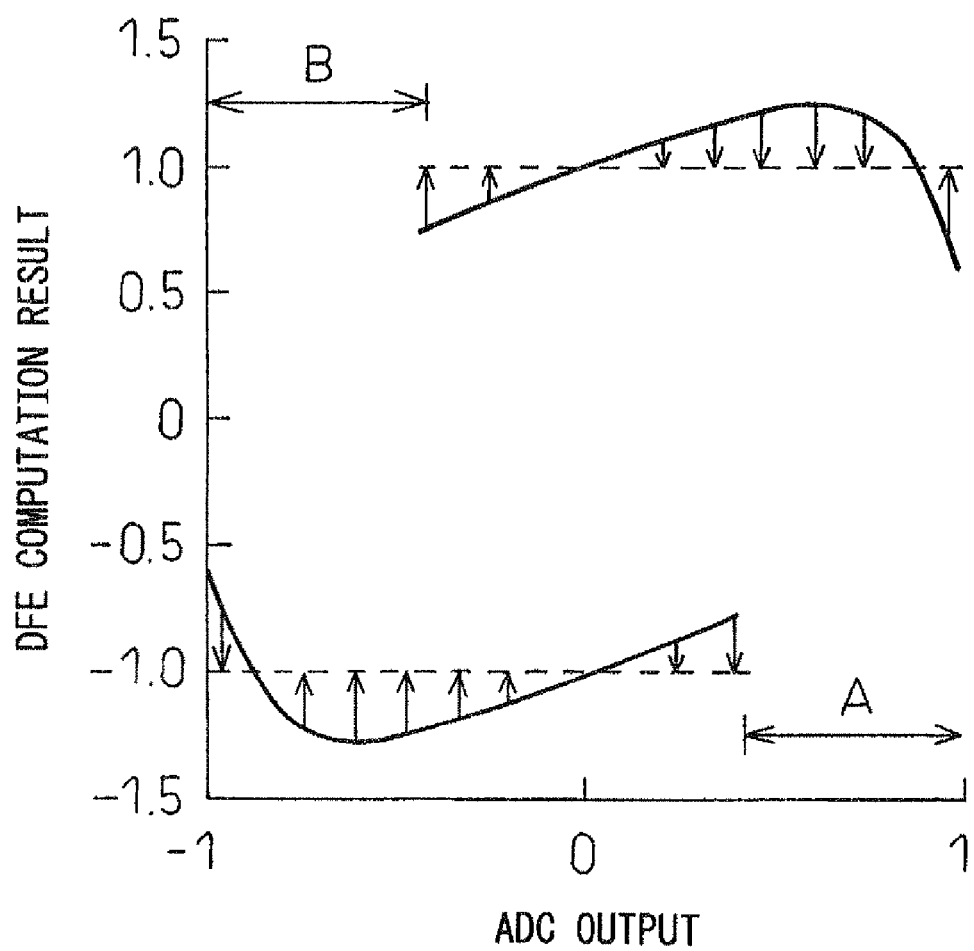
FIG. 6 is a diagram explaining a dependence on an input signal value resulting from the nonlinearity of input/output characteristics of an ADC.

FIG. 6 is a diagram explaining the dependence on $x_n$ resulting from the nonlinearity of the input/output characteristics of the ADC, illustrating the DFE computation result for the ADC output value, wherein the solid line indicates when the input/output characteristics of the ADC are nonlinear and the broken line indicates when the input/output characteristics of the ADC are linear. The values on the transverse axis and the vertical axis are normalized values. For example, FIG. 5 illustrates the result obtained by outputting a pattern of various kinds of serial data from the transmission circuit 1 in the state after equalization processing is performed and by performing statistical processing (average value calculation processing for each ADC output value) of the ADC output that the ADC 31 outputs and the DFE computation result that the equalization circuit 32 outputs for the output of the pattern. Further, it has been confirmed that the data indicated by the solid line may be obtained by forcedly converting the input to the ADC into nonlinear one as illustrated in FIG. 4 after acquiring the data indicated by the broken line using the ADC the input/output characteristics of which are linear and by inputting the nonlinear input to the ADC so that the ADC includes nonlinearity illustrated in FIG. 4.

As illustrated in FIG. 6, the ADC correction circuit 50 makes a correction so that the input/output characteristics indicated by the solid line change to the input/output characteristics indicated by the broken line. For example, a graph as illustrated in FIG. 5 is calculated and a conversion table is created based on the output value of the ADC 31 and the DFE computation result of the equalization circuit 32.

As described above, according to the first embodiment, it is possible to make the input/output characteristics of the ADC linear without adding a circuit within the ADC and without using a calibration signal. Due to this, the rate of correct reproduction of data to be transmitted via the transfer line is improved, i.e., the reproduction error of the transfer data may be reduced.

In the above explanation, only the nonlinearity of the ADC is focused on; however, there also exists nonlinearity in the transmission data. The transmission circuit 1 outputs a two-value level transmission signal as described above, however, the output includes nonlinearity because of the influence of the response characteristic of the driver. If the graph in FIG. 6 is created based on the transmission signal and the conversion table is created based thereon, the ADC correction circuit corrects both the nonlinearity of the transmission circuit and the nonlinearity of the ADC.

Figure 7:
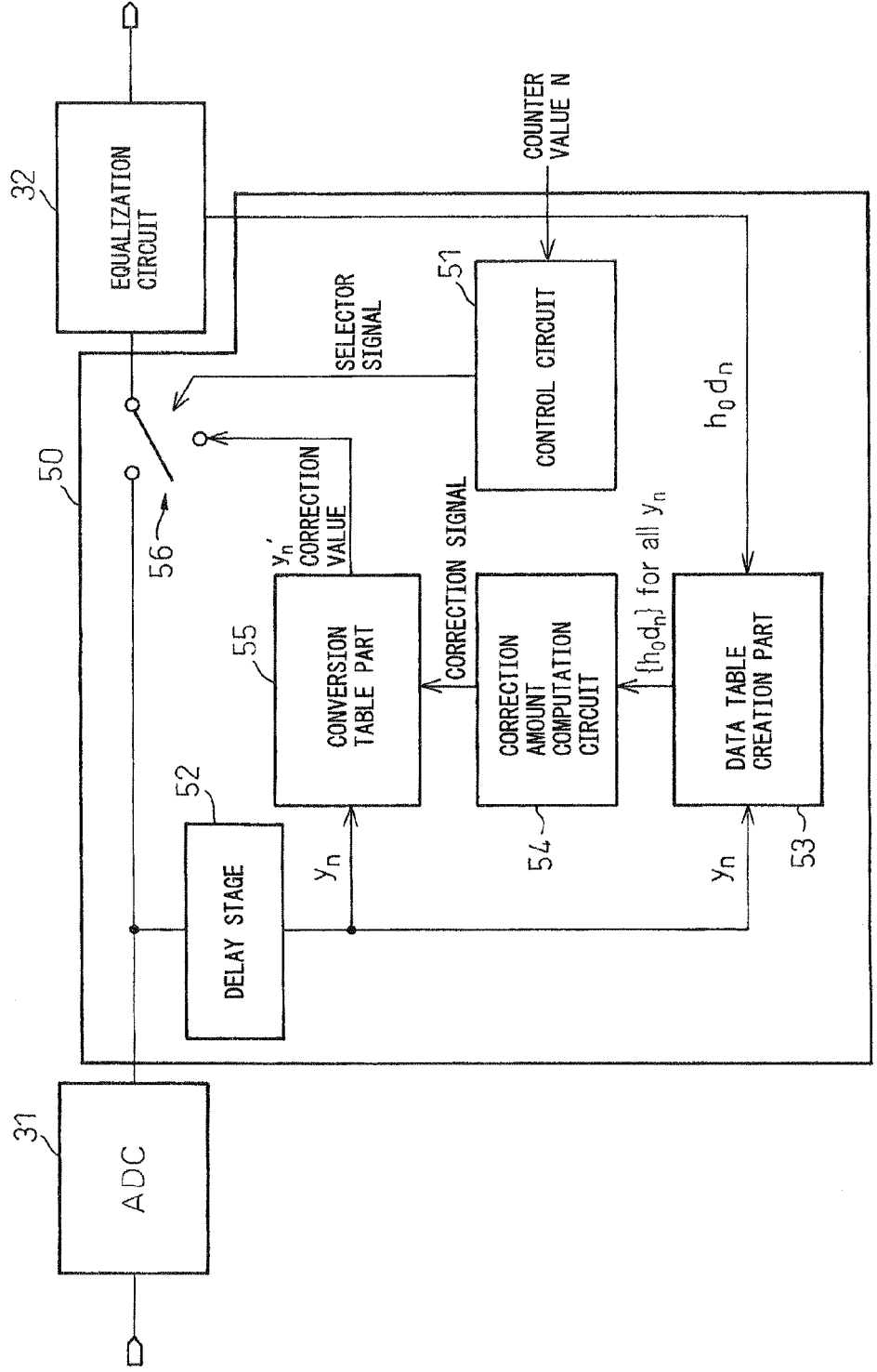
FIG. 7 is a diagram illustrating a configuration of a reception circuit in a second embodiment.

A signal transfer system in a second embodiment includes a basic configuration as illustrated in FIG. 5. FIG. 7 is a block diagram illustrating a configuration of a reception circuit 3 in the second embodiment. As illustrated in FIG. 7, the reception circuit 3 includes an ADC 31, an equalization circuit 32 and an ADC correction circuit 50.

The ADC correction circuit 50 includes a control part 51 that controls each component of the ADC correction circuit 50, a delay stage 52 that appropriately delays an output of the ADC 31 in accordance with a delay amount of the equalization circuit, a data table creation part 53 that creates a data table from an ADC output $y_n$ output from the delay stage and a DFE computation result $h_0d_n$ output from the equalization circuit 32, a correction amount computation circuit 54 that computes an amount of correction based on the data from the data table creation part 53, a conversion table part 55 that includes a conversion table created based on the amount of correction computed by the correction amount computation circuit 54 and converts an ADC output from the delay stage 52, and a switch 56 that switches a signal to be input to the equalization circuit 32 between the output of the ADC 31 and the output of the conversion table part 55.

Figure 8:
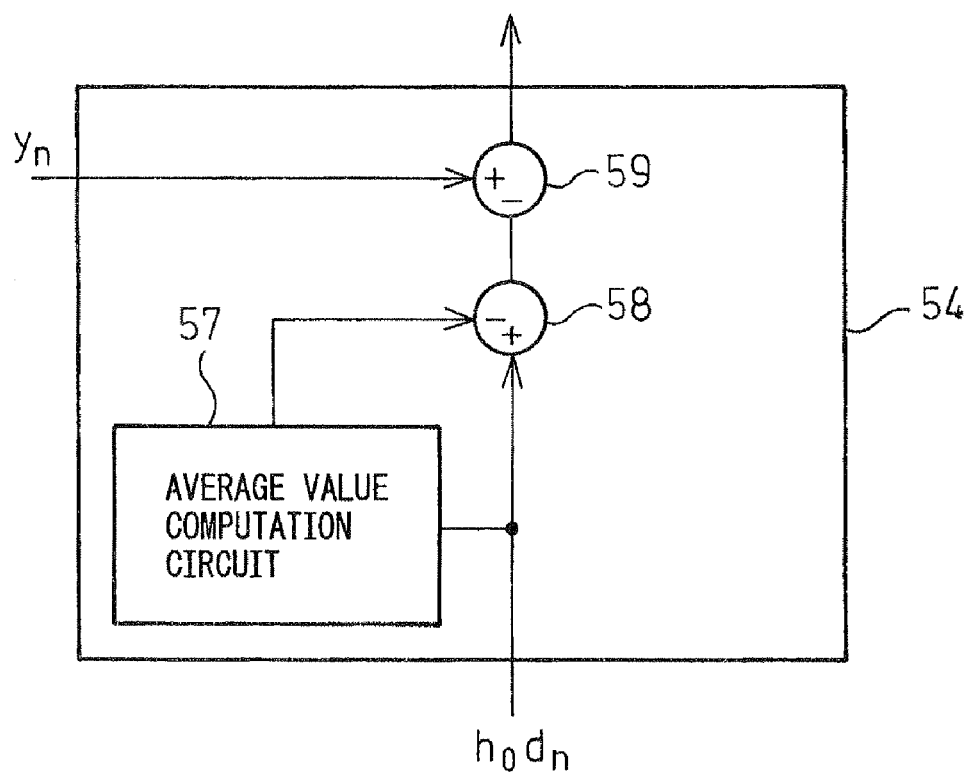
FIG. 8 is a configuration diagram of a correction amount computation circuit of an ADC correction circuit in the second embodiment.

FIG. 8 is a diagram illustrating a configuration of the correction amount computation circuit 54. The correction amount computation circuit 54 includes an average value computation circuit 57 that computes an average value of $h_0d_n$ for the ADC value $y_n$ during a certain period of time, a subtraction circuit 58 that subtracts a corresponding average value output from the average value computation circuit 57 from each $h_0d_n$, and a subtraction circuit 59 that subtracts the output of the subtraction circuit 58 from each $y_n$.

Figure 9:
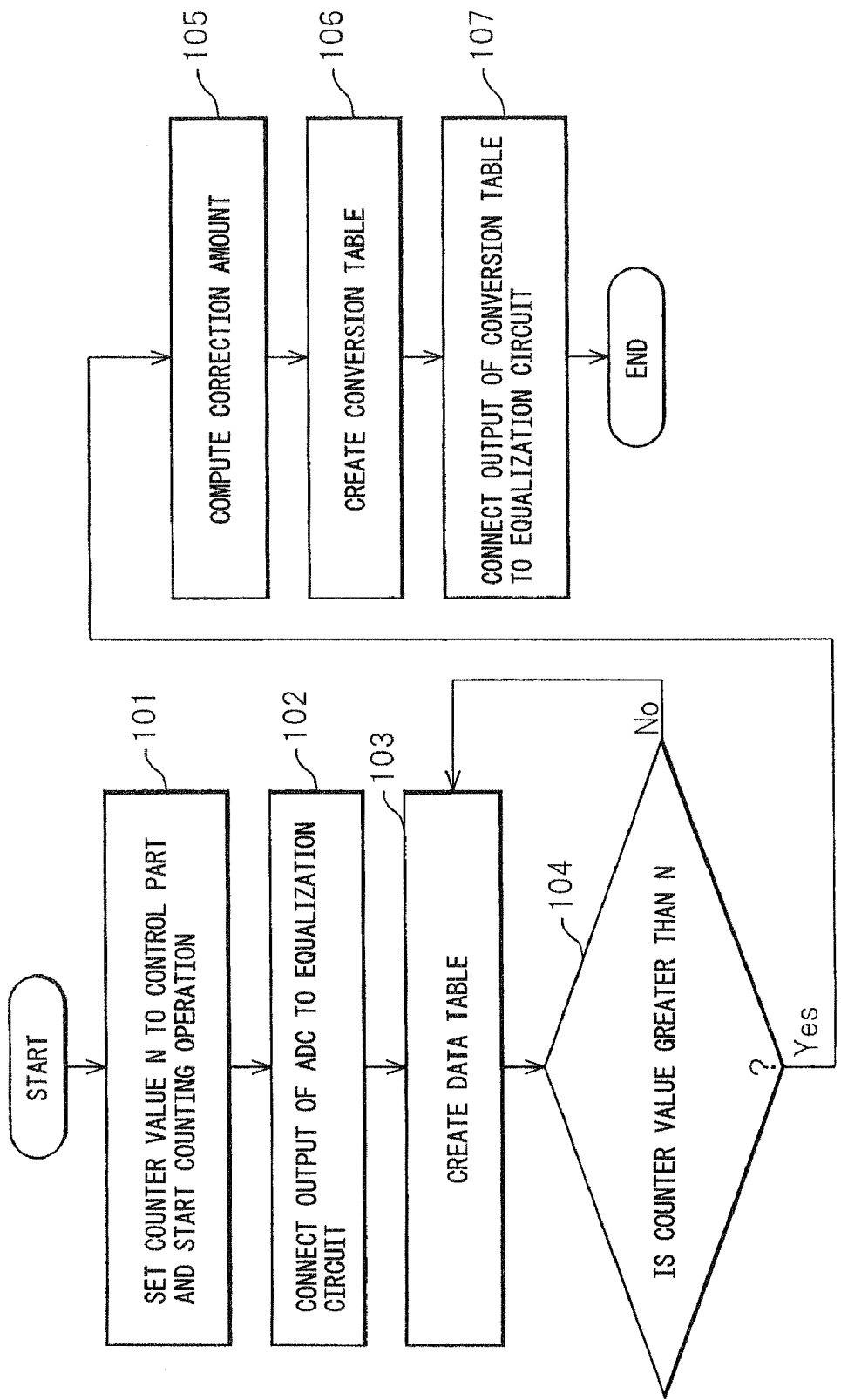
FIG. 9 is a flowchart illustrating conversion table creation processing of the ADC correction circuit in the second embodiment.

FIG. 9 is a flowchart illustrating conversion table creation processing of an ADC in the second embodiment. The conversion table creation processing of an ADC is explained below in accordance with the flowchart in FIG. 9.

It is assumed that a coefficient of the equalization circuit 32 is set before the conversion table creation processing of an ADC is initiated.

In step 101, a counter value N is set to the control part 51 and the counting operation is initiated. The counter value indicates the number of times necessary to acquire a graph illustrated in FIG. 6 statistically.

In step 102, at the same time as step 101, the switch 56 is switched so that the output of the ADC 31 is input to the equalization circuit 32.

In step 103, a data table is created by the data table creation part 53. Sequence data is input from a transmission circuit 1 to the ADC 31 via a transfer circuit 2 and in response to this, the ADC 31 outputs the ADC value $y_n$. The equalization circuit 32 performs equalization processing on the ADC value and outputs the calculation result $h_0d_n$ illustrated in expressions 1 and 2. The data table creation part 53 associates the ADC value $y_n$ with $h_0d_n$ and creates a data table in which the computed result of the time average (ensemble average) of $h_0d_n$ corresponding to each ADC value is stored. The value of $d_n$ takes two values in the case of binary signal transfer and two data tables are prepared in accordance with the sign of $h_0d_n$.

In step 104, whether the counter value exceeds the set N is determined and step 103 is repeated until the counter value exceeds the set N. Due to this, a data table for N sets of ADC value $y_n$ and $h_0d_n$ is created.

In step 105, the correction amount computation circuit 54 computes an amount of correction. The average value computation circuit 57 in FIG. 8 computes an average value of $h_0d_n$ in the data table and takes it as an expectation value of $h_0d_n$ for all of the ADC values $y_n$. This average value corresponds to the level indicated by the broken line in FIG. 6. The subtracter 58 computes a difference between the value of $h_0d_n$ corresponding to each ADC value $y_n$ in the data table and the average value. This difference corresponds to the amount of correction indicated by the arrow in FIG. 6. Further, the subtracter 59 subtracts the difference from the ADC value $y_n$. This subtraction result is the ADC correction value used to correct the ADC value $y_n$.

As described above, here the value of $d_n$ includes two values and two data tables exist corresponding to the sign of $h_0d_n$ and are indicated by the two graphs on the lower side (side of smaller ADC values) and on the upper side (side of larger ADC values) in FIG. 6. As illustrated in FIG. 6, two graphs exist in the vicinity of the part where the ADC values are intermediate (in the vicinity of the part where the ADC value is zero). For this part, an average value of a difference (arrow) calculated from the two graphs is used.

Further, an area denoted by A in FIG. 6 illustrates a range of large ADC values where the DFE computation result is unlikely to be determined to be "0". Similarly, an area denoted by B illustrates a range of small ADC values where the DFE computation result is unlikely to be determined to be "1".

In step 106, the conversion table part 55 creates a conversion table in which the correction value of ADC computed in step 105 is associated with the ADC value $y_n$.

In step 107, the switch 56 is connected so that the output of the conversion table part 55 is input to the equalization circuit 32. Due to this, the correction value $y'_n$ of ADC the nonlinearity of the input/output characteristics of which has been corrected is input to the equalization circuit 32 and equalization processing is performed.

For N pieces of data, it is desirable for each ADC value $y_n$ to appear with a frequency more than a certain one so that the graph in FIG. 6 may be created; however, for the ADC value $y_n$ that does not appear, it may also be possible to compute a correction value by the interpolation method etc.

The above-mentioned conversion table creation processing is performed at least at the time of initialization. The conversion table created at the time of initialization may be maintained as it is or the conversion table may be updated at any time by performing the conversion table creation processing. In the state where the normal operation is performed on the correction value $y'_n$, the nonlinearity of which has been corrected by the conversion table, it is possible to further compute a correction value for the correction value $y'_n$ of ADC by inputting the correction value $y'_n$ to the data table creation part 53 and performing the same processing as described above. The conversion table may be updated by applying the correction value to the correction value $y'_n$ of ADC. By updating the conversion table, it is possible to deal with the change in the input/output characteristics of ADC due to the change in temperature etc.

Figure 10:
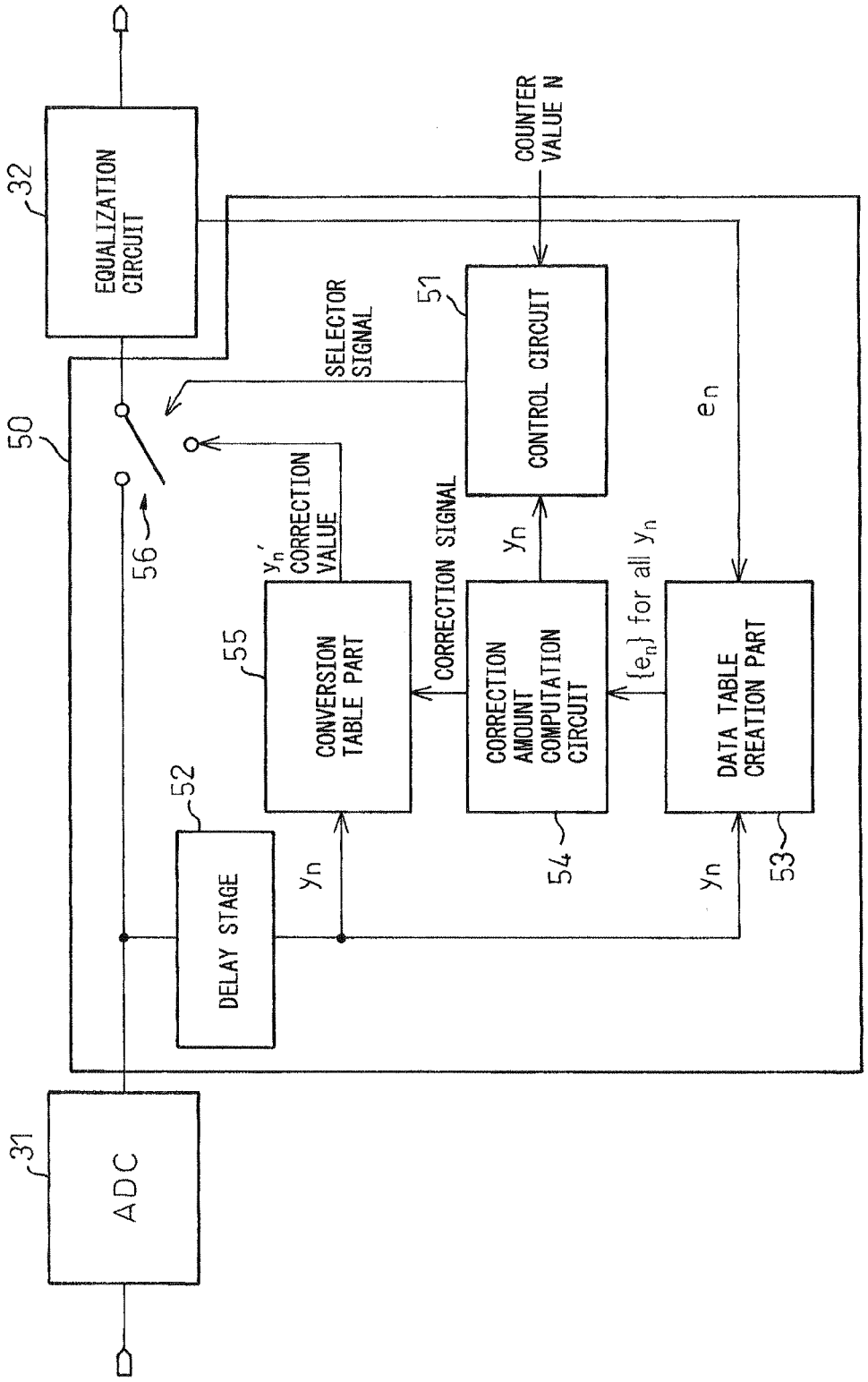
FIG. 10 is a diagram illustrating a configuration of a reception circuit in a third embodiment.

FIG. 10 is a diagram illustrating a configuration of a reception circuit of a signal transfer system in a third embodiment. The signal transfer system in the third embodiment includes the basic configuration as illustrated in FIG. 5 and the reception circuit resembles the reception circuit of the signal transfer system in the second embodiment; however, the following points are different.

The first point of difference between the third embodiment and the second embodiment is that the switching timing of the selector signal at which the switch 56 is switched is when all of the ADC values $y_n$ appear more than a certain number of times. The ADC value $y_n$ is input to the control part 51 via the correction amount computation circuit 54, the number of times of appearance is counted, and when all of the ADC values $y_n$ appear more than the certain number of times, the switch 56 is switched by a selector signal from the control section 51.

The second point of difference is that the calculation result $h_0d_n$ output from the equalization circuit 32 is utilized in the second embodiment; however, in the third embodiment, an error $e_n$ generated in the equalization circuit 32 is utilized. As illustrated in FIG. 3, the equalization circuit 32 computes the error $e_n$ for the result of equalization processing. The coefficient of the equalization circuit 32 is determined so as to compensate for the deterioration of the signal in the transfer line 2 and it may be thought that the error $e_n$ results from the nonlinearity of the input/output characteristics of ADC. Because of this, if the error $e_n$ is made to become zero, the input/output characteristics of ADC may be regarded as linear, and therefore, the graph as illustrated in FIG. 6 is created as to the error $e_n$, that is, the graph in which the error $e_n$ for the ADC value $y_n$ is plotted is created. In this case, the expectation value is zero and the correction value is calculated so that the graph becomes zero. It is desirable that the graph be created for all of the ADC values $y_n$; however, in actuality, the graph is created for several ADC values $y_n$ because due to time, and other ADC values are acquired by interpolation.

The data table creation part 53 creates a data table by associating the ADC value $y_n$ with the error $e_n$ and computing the time average of the error $e_n$ corresponding to each ADC value $y_n$. In this case, the expectation value is only zero, and therefore, there is only one data table.

Figure 11:
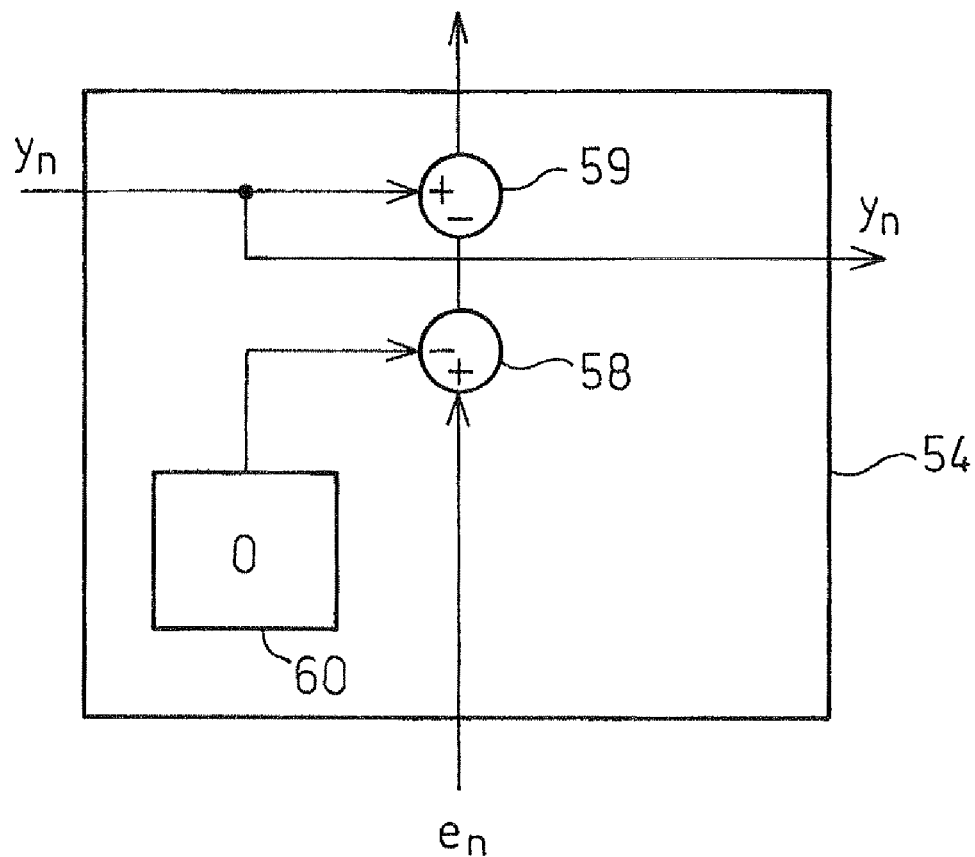
FIG. 11 is a configuration diagram of a correction amount computation circuit of an ADC correction circuit in the third embodiment.

FIG. 11 is a diagram illustrating a configuration of the correction amount computation circuit 54. As described above, the expectation value is zero, and therefore, a register 60 that outputs zero is provided instead of the average value computation circuit 57. The other parts are the same as those in the second embodiment and their explanation is omitted.

Figure 12:
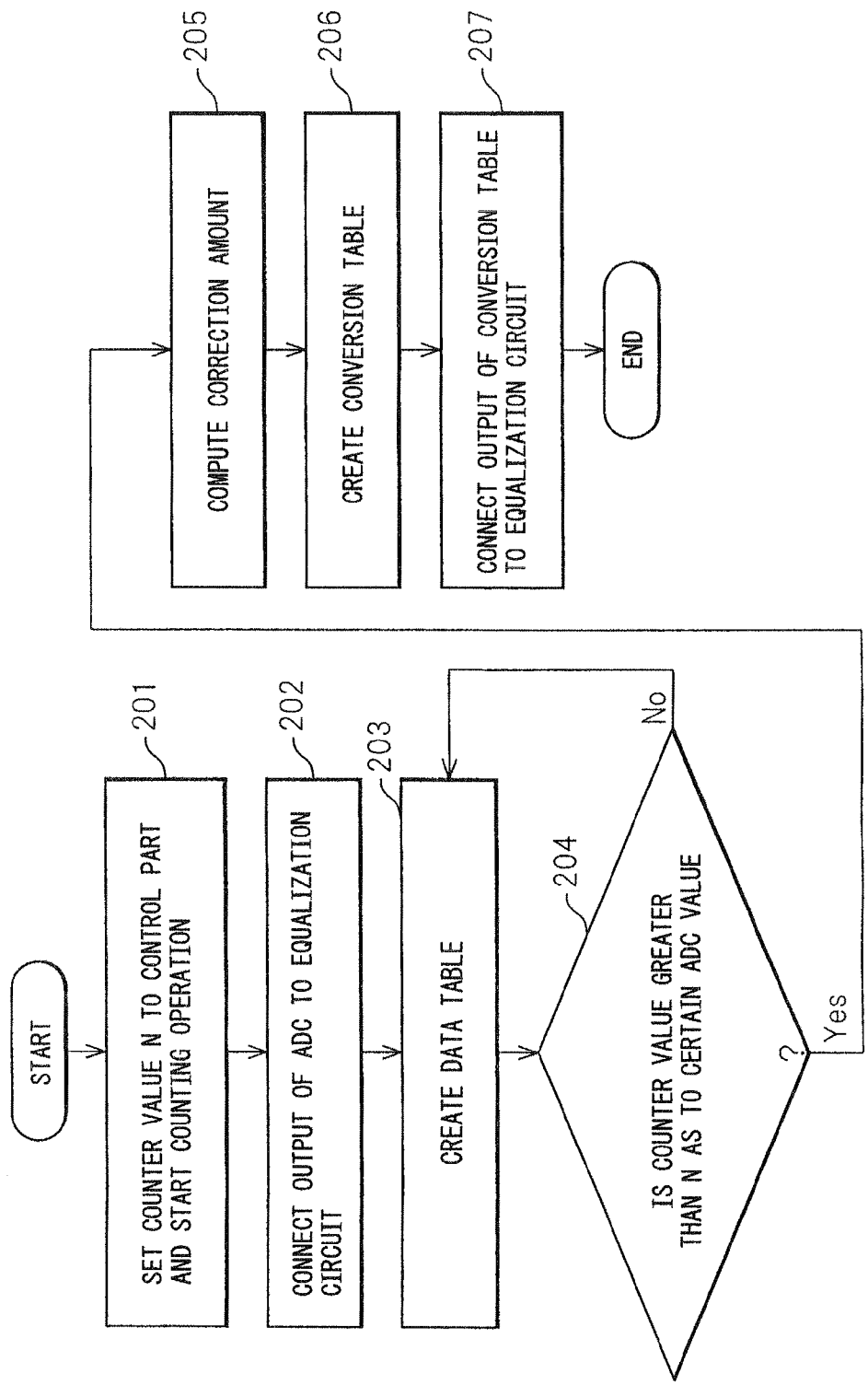
FIG. 12 is a flowchart illustrating conversion table creation processing of the ADC correction circuit in the third embodiment.

FIG. 12 is a flowchart illustrating conversion table creation processing in the third embodiment. The third embodiment differs from the second embodiment in that the error $e_n$ is used in steps 203, 205 and 206 and in that whether the number of times of appearance of a certain ADC value is greater than N is determined in step 204. The other parts are the same as those in the second embodiment, and therefore, their explanation is omitted.

Figure 13:
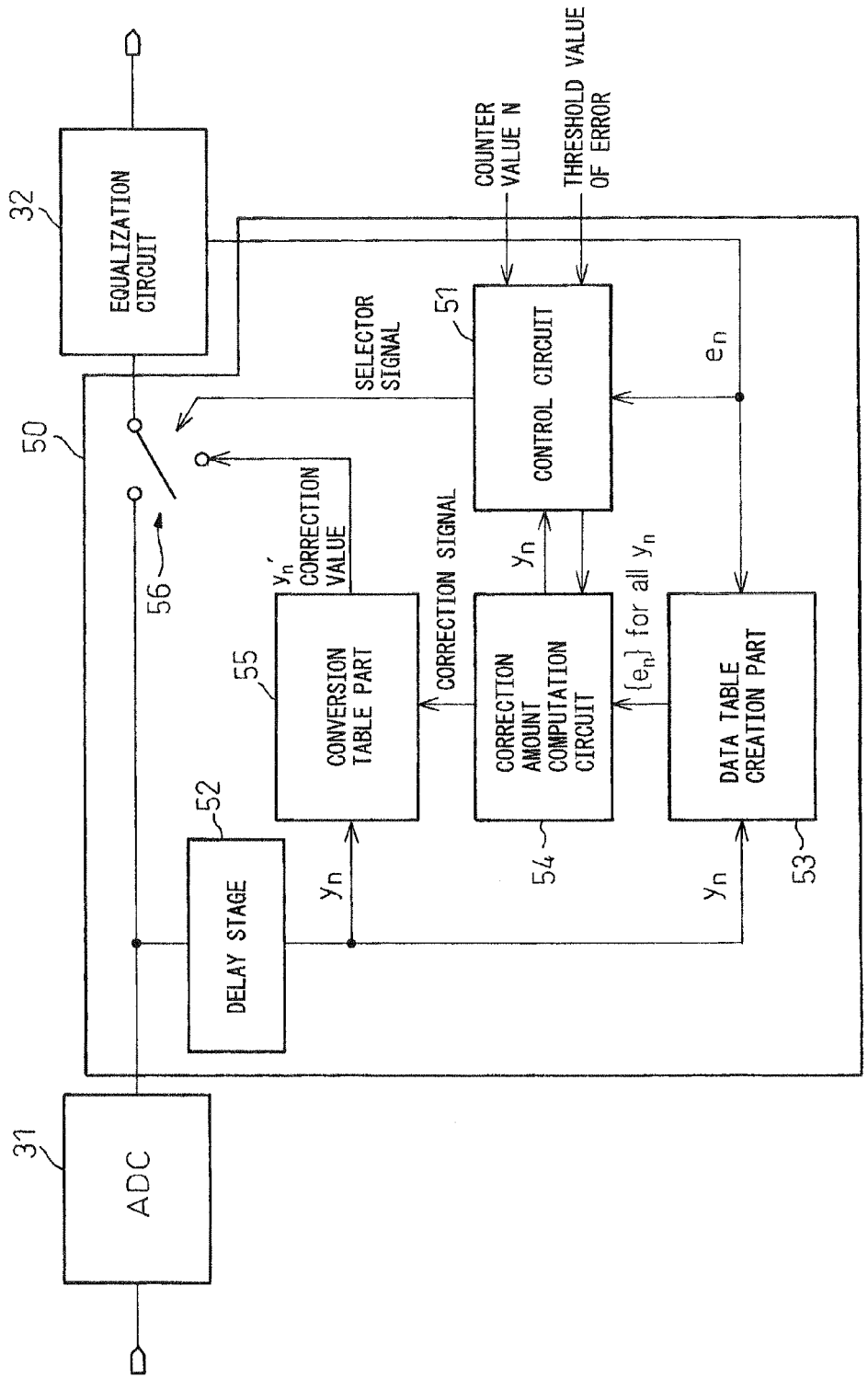
FIG. 13 is a diagram illustrating a configuration of a reception circuit in a fourth embodiment.

FIG. 13 is a diagram illustrating a configuration of a reception circuit of a signal transfer system in a third embodiment. The signal transfer system in the fourth embodiment includes the basic configuration as illustrated in FIG. 5 and the reception circuit resembles the reception circuit of the signal transfer system in the third embodiment, however, the following point is different.

The fourth embodiment differs from the third embodiment in that the error $e_n$ is supplied to the control part 51 from the equalization part 32 and an expectation value a of the error of the DFE computation result is set as well as the counter value N. As described above, in the third embodiment, the graph is created, as in FIG. 6, by plotting the error $e_n$ for the ADC value $y_n$, and the expectation value is set to zero. However, in actuality, the small error is preferable for the equalization processing of the equalization part 32 even if the expectation value somewhat deviates from zero. In other words, if the expectation value is set to a value other than zero, there may be a case where it becomes smaller than the error $e_n$ or the square of the error $e_n$, and therefore, the conversion table is created with such a case being taken into consideration.

In the fourth embodiment, the conversion table is created by adjusting the expectation value a so that the error $e_n$ or the square of the error $e_n$ is equal to or less than a certain threshold value in the conversion table creation processing in the third embodiment. Because of this, in the fourth embodiment, the expectation value a is variable.

Figure 14:
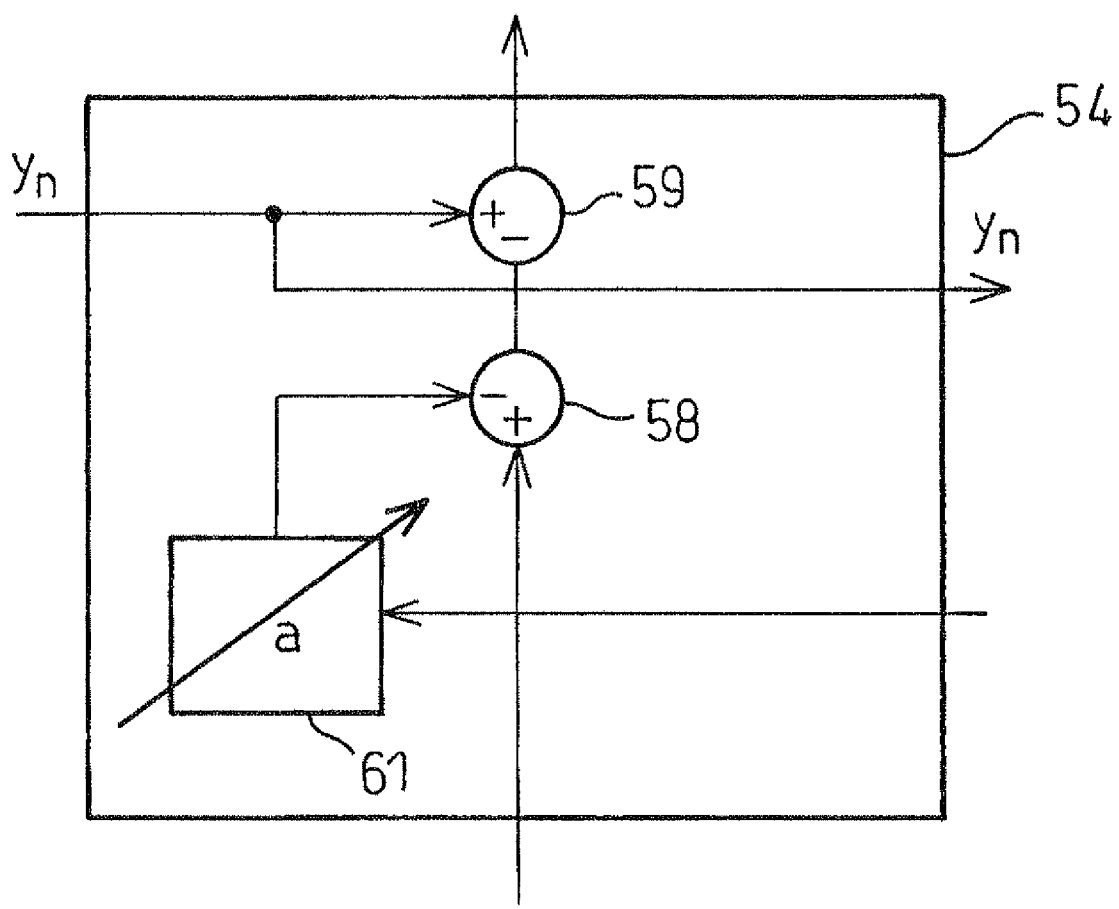
FIG. 14 is a configuration diagram of a correction amount computation circuit of an ADC correction circuit in the fourth embodiment.

FIG. 14 is a diagram illustrating a configuration of the correction amount computation circuit 54. As described above, the expectation value a is variable and a register 61 that outputs the expectation value a that is set is provided instead of the average value computation circuit 57. The other parts are the same as those in the second embodiment, and therefore, their explanation is omitted.

Figure 15:
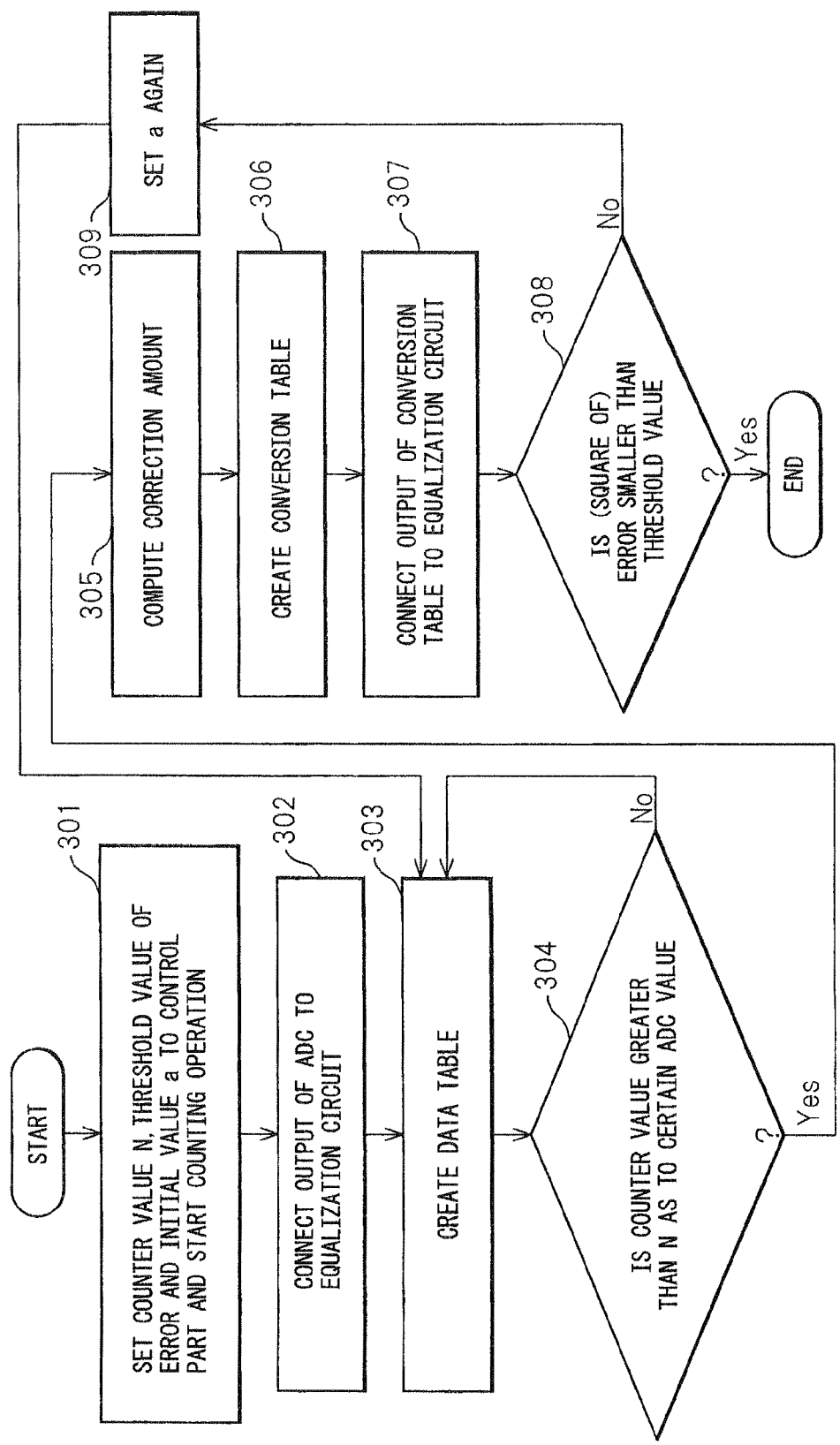
FIG. 15 is a flowchart illustrating conversion table creation processing of the ADC correction circuit in the fourth embodiment.

FIG. 15 is a flowchart illustrating the conversion table creation processing of ADC in the fourth embodiment.

In step 301, the counter value N, a threshold value of the error, and the initial expectation value a are set to the control part 51 and the counting operation is initiated. The initial expectation value a is set to a small value.

In step 302, the switch 56 is switched so that the output of the ADC 31 is input to the equalization part 32 at the same time of step 301.

In step 303, the data table creation section 53 creates a data table by associating the ADC value $y_n$ with the error $e_n$ and computing the time average of the error $e_n$ corresponding to each ADC value $y_n$.

In step 304, as to the certain ADC value described above, whether the counter value becomes greater than the set N is determined and step 303 is repeated until the counter value exceeds the set N. Due to this, as to the certain ADC value, a data table for the N sets or more of the ADC value $y_n$ and $h_0d_n$ is created.

In step 305, the correction amount computation circuit 54 computes an amount of correction. This processing is the same as that in the third embodiment.

In step 306, the conversion table part 55 creates a conversion table in which the correction value of ADC computed in step 305 is associated with the ADC value $y_n$.

In step 307, the switch 56 is connected so that the output of the conversion table part 55 is input to the equalization part 32. Due to this, the correction value $y'_n$ of ADC the nonlinearity of input/output characteristics of which has been corrected is input to the equalization part 32 and equalization processing is performed.

In step 308, for the result of equalization processing performed by the equalization part 32 on the correction value $y'_n$ of ADC the nonlinearity of input/output characteristics of which has been corrected using the conversion table, an error or the square of an error is calculated and output to the control part 51. The control part 51 determines whether the error $e_n$ or the square of error $e_n$ is smaller than a threshold value as well as storing the error $e_n$ or the square of the error $e_n$ and when smaller, the processing is ended or when not smaller, the processing proceeds to step 309.

In step 309, the expectation value a is set again so as to vary slightly and then the processing returns to step 303. After that, steps 303 to 309 are repeated until the error $e_n$ or the square of the error $e_n$ becomes smaller than the set threshold value and the expectation value a is set so that the error $e_n$ or the square of the error $e_n$ becomes equal to or smaller than the threshold value and a conversion table in accordance therewith is created. In step 308, the error $e_n$ or the square of the error $e_n$ when the conversion table in accordance with the previous expectation value a is stored, and when it is determined that the error $e_n$ or the square of the error $e_n$ increases conversely with a new expectation value, which is the expectation value a that has been varied slightly, the direction in which the expectation value a is varied is changed or the change of the expectation value a is terminated and the utilization of a conversion table in accordance with the expectation value a immediately before is determined.

Figure 16:
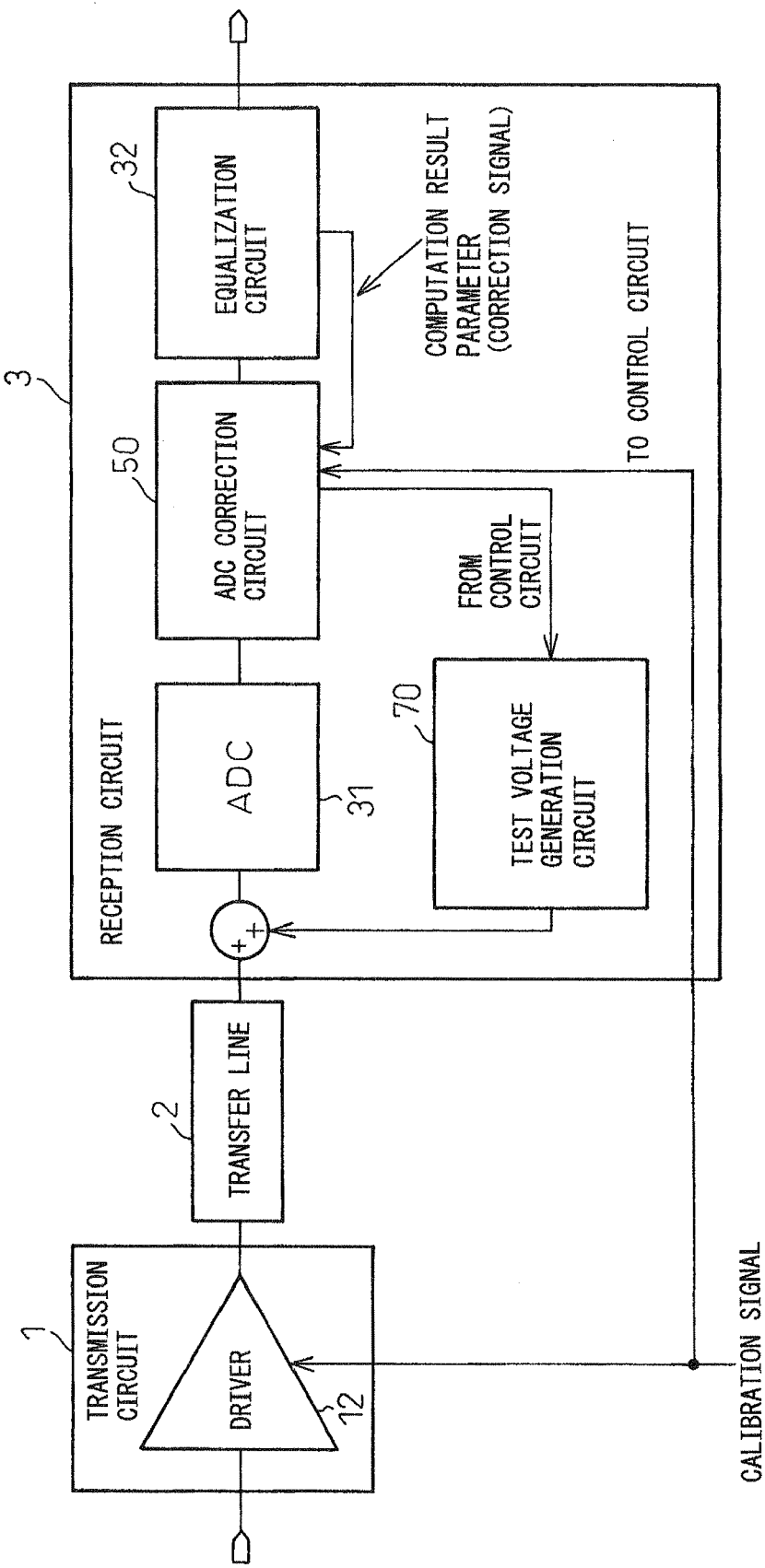
FIG. 16 is a diagram illustrating a configuration of a signal transfer system in a fifth embodiment.

FIG. 16 is a diagram illustrating a configuration of a signal transfer system in a fifth embodiment. As illustrated in FIG. 16, the signal transfer system differs from the signal transfer system in the second embodiment in that a calibration signal is supplied to the driver 12 of the transmission circuit 1 and the ADC correction circuit 50 of the reception circuit 3 and in that a test voltage generation circuit 70 is provided in the reception circuit 3.

The test voltage generation circuit 70 generates a test voltage, which is a direct current voltage wider than the input quantization range of the ADC 31, based on the instruction from the control part 51 of the ADC correction circuit 50 and adds the test voltage to the input part of the ADC 31. When a calibration signal is supplied, the driver 12 of the transmission circuit 12 ceases its output. In other words, the driver 12 brings the output into a high-impedance state, i.e., an open state. Because of this, the test voltage output from the ADC correction circuit 50 is input to the ADC 31 as a result.

The test voltage generation circuit 70 varies the test voltage in accordance with the instruction of the control part 51 of the ADC correction circuit 50. The control part 51 counts the frequency of output of the ADC value output from the equalization part 32 and adjusts the test voltage so that the ADC value output from the ADC 31 takes all the values in the entire range. Due to this, it is possible to test the output of ADC in the entire range and to shorten the conversion table creation time by performing correction in advance without depending on the characteristics of the transmission circuit 1. The other parts are the same as those in the second embodiment.

Figure 17:
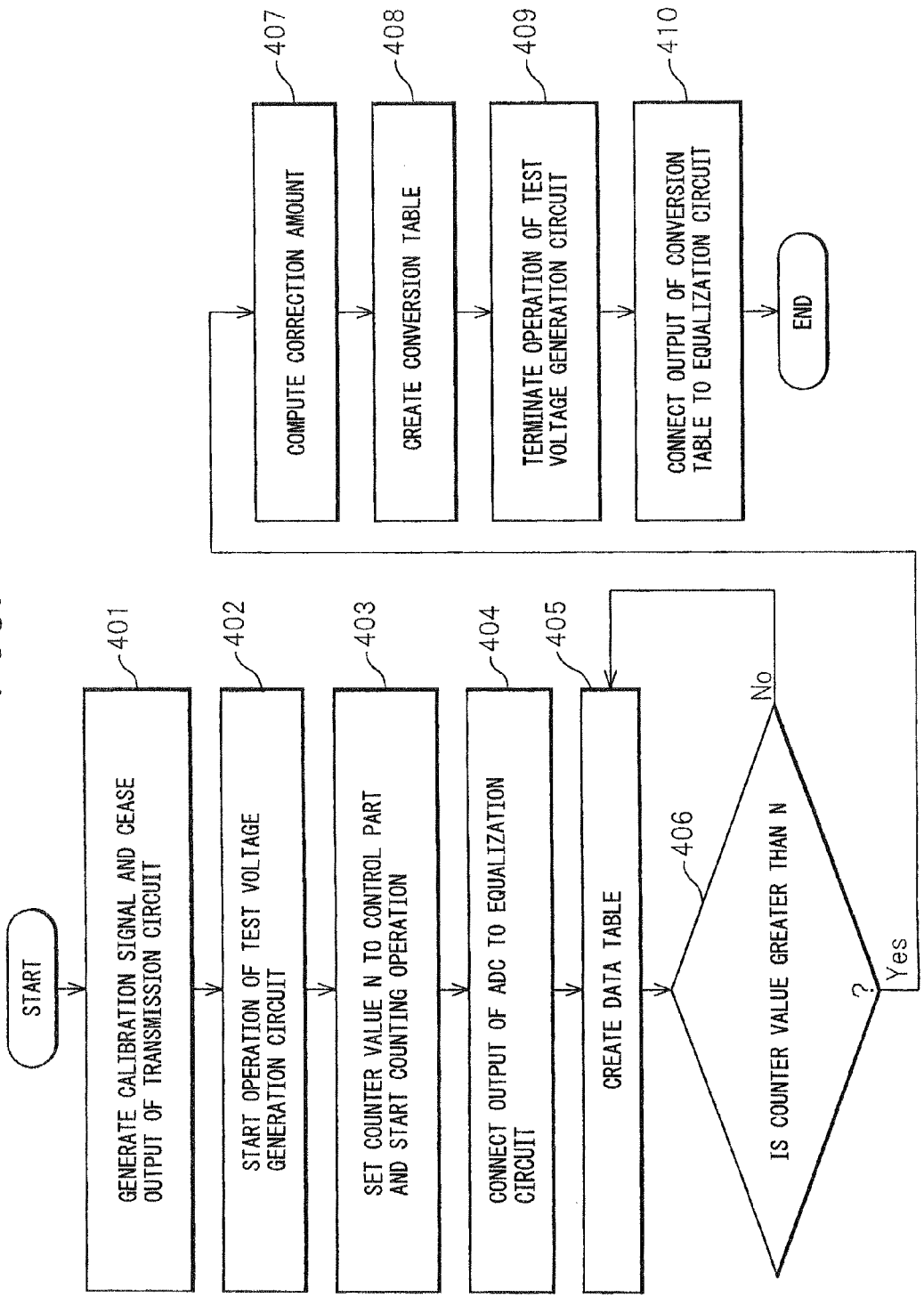
FIG. 17 is a flowchart illustrating conversion table creation processing of the ADC correction circuit in the fifth embodiment.

FIG. 17 is a flowchart illustrating the conversion table creation processing of ADC in the fifth embodiment.

In step 401, a calibration signal is generated and the output of the driver 12 of the transmission circuit 1 is ceased.

In step 402, by the instruction of the control part 51, the test voltage generation circuit 70 starts the operation and generates a test voltage. In response to this, the test voltage is applied to the input of the ADC 31, and therefore, the ADC 31 outputs an ADC value, which is the digitally converted test voltage.

In step 403, the counter value N is set to the control part 51 and the counting operation is initiated.

In step 404, the switch 56 is switched so that the ADC value output from the ADC 31 is input to the equalization part 32.

Steps 405 and 406 are the same as those in the second embodiment and a data table is created and the control part 51 controls the test voltage generation circuit 70 and adjust the test voltage so that the ADC value output from the ADC 31 takes all the values in the entire range. When a data table is created so that the ADC value takes all of the values in the entire range N times or more, the processing proceeds to step 407.

Steps 407 and 408 are the same as steps 105 and 106 in the second embodiment.

In step 409, the calibration signal is terminated and in response to this, the driver 12 enters the outputting state and the test voltage generation circuit 70 terminates the operation.

Step 410 is the same as step 107 in the second embodiment.

When the input range (input quantization range) of the ADC 31 is extended for the output range of the transmission circuit 1 to be connected, it is desirable to correct nonlinearity when performing a test for the entire range of the input range of ADC in a test before shipping of the reception circuit 3 despite the nonlinearity of the transmission circuit 1. Because of this, it is desirable to provide the test voltage generation circuit 70 as in the fifth embodiment. It is possible to shorten the time desired to create a conversion table in the field by providing the test voltage generation circuit 70 to correct nonlinearity in advance as in the fifth embodiment. Further, as described above, in the second to fourth embodiments in which the conversion table is created based on the transmission signal transmitted from the transmission circuit 1 via the transfer line 2 and input to the ADC 31, the ADC correction circuit 50 corrects the nonlinearity of ADC as well as the nonlinearity of the transmission circuit; however, in the fifth embodiment, the conversion table is created based on the signal generated by the test voltage generation circuit 70, and therefore, the nonlinearity of the transmission circuit is not affected. If the conversion table created based on the signal generated by the test voltage generation circuit 70 is compared with the conversion tables created in the second to fourth embodiments, the nonlinearity of the transmission becomes clear.

Figure 18:
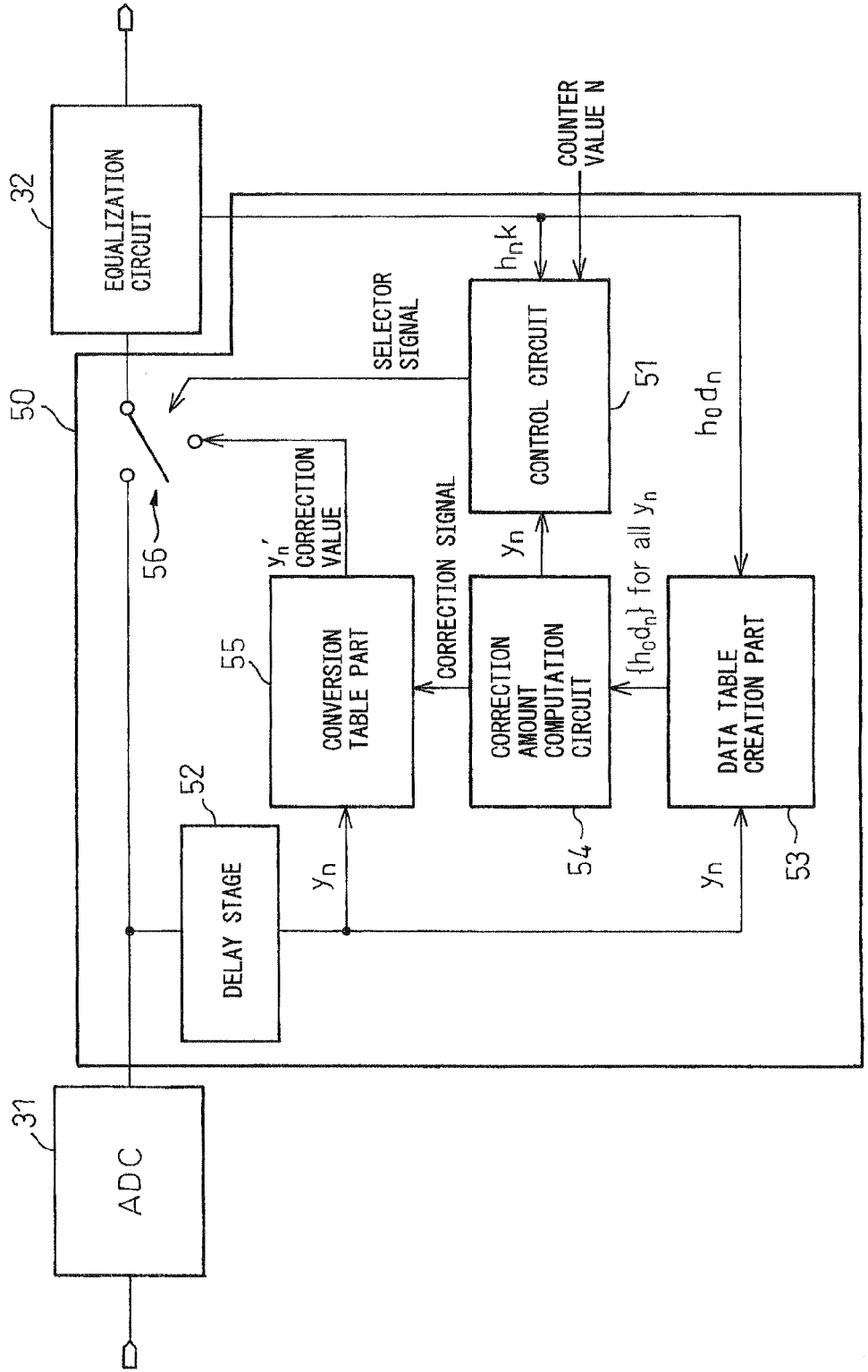
FIG. 18 is a diagram illustrating a configuration of a reception circuit in a sixth embodiment.

FIG. 18 is a diagram illustrating a configuration of the reception circuit 3 of a signal transfer system in a sixth embodiment. The signal transfer system in the sixth embodiment includes the basic configuration as illustrated in FIG. 5 and its reception circuit resembles the reception circuit of the signal transfer system in the second embodiment as illustrated in FIG. 18; however, differs from that in that a coefficient $h_n k$ of the equalization circuit 32 is supplied to the control circuit 51. The control circuit 51 estimates an output range of the ADC 31 based on the calculation result $h_0 d_n$ supplied from the equalization circuit 32 and the coefficient $h_n k$. This is based on the fact that there is a relation between the loss of the transfer line 2 and the range that the output of the ADC 31 may take, and due to this, it is possible to shorten time because the range in which the frequency of the ADC value is counted is limited.

For example, the control circuit 51 calculates a time average $<hk>$ (ensemble average) for n of the coefficient $h_n k$ and the output range that ADC may take for received data +1 is from a value (here, this is denoted as A) obtained by subtracting a value of $<h0>-\Sigma hj$ (j=1, . . . , M) multiplied by the full scale from the full scale to the maximum value of the full scale. Similarly, 0 to A is the output range that ADC may take for received data −1. Because of this, it is necessary to count the frequency of appearance of the ADC value only in this range.

The other parts in the sixth embodiment are the same as those in the second embodiment.

Figure 19:
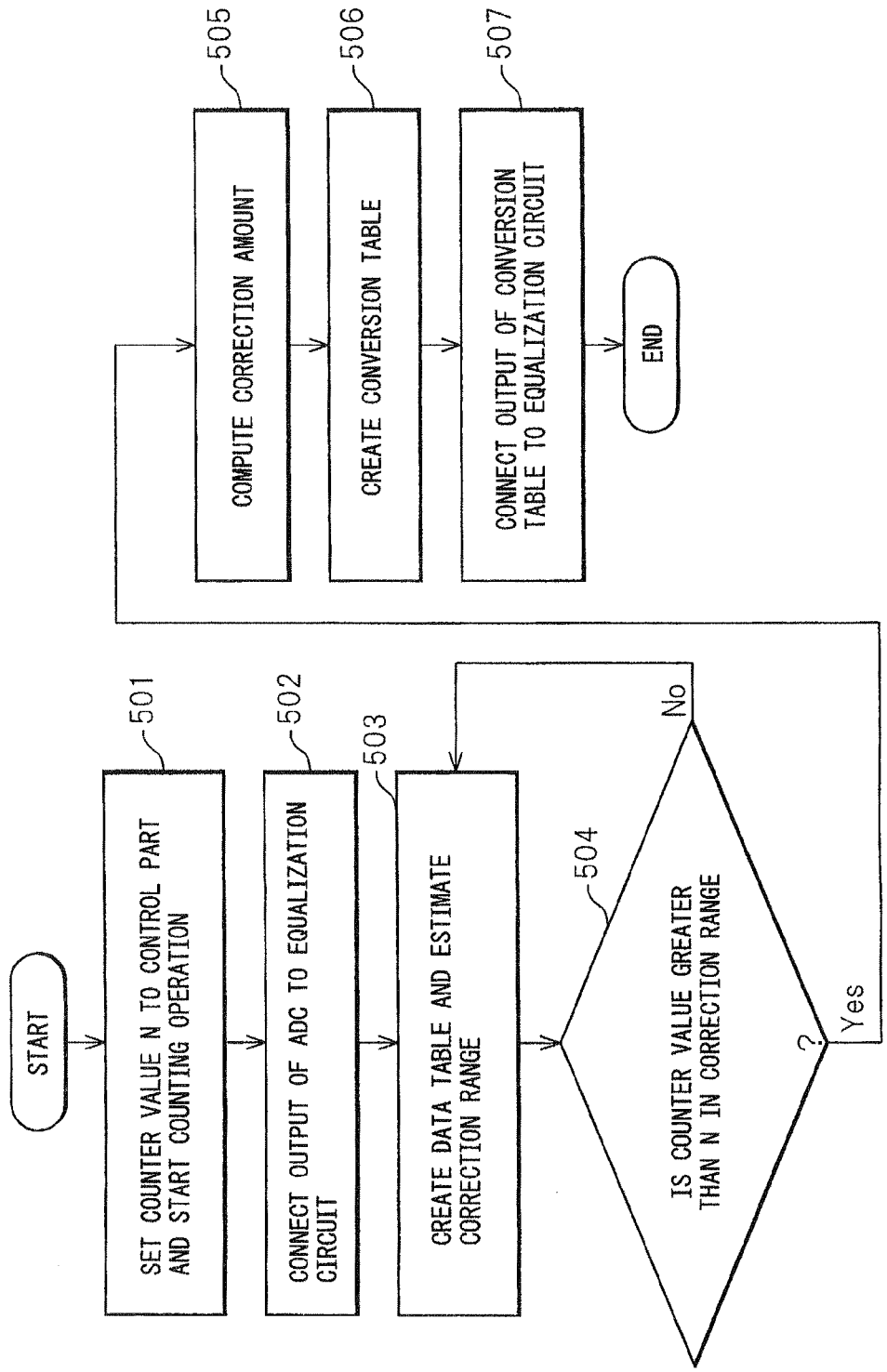
FIG. 19 is a flowchart illustrating conversion table creation processing of the ADC correction circuit in the sixth embodiment.

FIG. 19 is a flowchart illustrating conversion table creation processing of ADC in the sixth embodiment. This flowchart resembles the flowchart in the second embodiment in FIG. 19 and differs from that only in steps 503 and 504.

In step 503, a data table is created and at the same time, an output range of the ADC 31 is estimated as described above. In step 504, whether the frequency of appearance of ADC is greater than N in the estimated correction range is determined. Other explanations are omitted.

As explained above, in the embodiments, a conversion table is used, and therefore, it is not necessary to provide a correction circuit in the ADC circuit and the load capacity is not increased. For example, compared to the conventional example in which the correction circuit is provided in the ADC circuit, the capacity is about ½, and therefore, the operatable frequency (band) of ADC is about twice.

Further, no correction circuit is provided, and therefore, it is not necessary to add a part that operates based on a clock and the power consumption may be reduced about 30% compared to the above-described conventional example.

Furthermore, the conversion table is created based on the ADC value output from ADC and the output of the equalization circuit, and therefore, it may be realized with a simple circuit configuration. In the conventional example in which the conversion table is used, a complicated calibration signal generation circuit is used to create a conversion table, however, no calibration signal generation circuit is required in the embodiments. The conversion table is created during the period of normal operation, and therefore, no time is desired for calibration.

The embodiments may be applied to any signal transfer system that uses ADC and to any reception circuit used in such a signal transfer system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment of the present invention have been described in detail, it should be understood that the various changes, substitutions, and alterations could be made hereto without departing from the spirit and scope of the invention.

What is claimed is:

1. A reception circuit comprising:
   an AD converter that outputs digital data in accordance with an input signal;
   a correction circuit that corrects nonlinearity of the AD converter; and
   an equalization circuit that equalizes the corrected digital data, wherein
   the correction circuit comprises:
      a conversion table used to convert digital data output from the AD converter; and
      a correction amount computation circuit that creates the conversion table from the output data of the AD converter and the output of the equalization circuit.

2. The reception circuit according to claim 1, wherein the correction amount computation circuit creates the conversion table so that there is no dependence between the ADC output value of the AD converter and the estimation result by the equalization circuit for the ADC output value.

3. The reception circuit according to claim 2, wherein the correction amount computation circuit takes the expectation value of the estimation of the equalization circuit for the ADC output value as an average value and a deviation from the average value of the estimation result for each ADC output value as a value indicative of the dependence.

4. The reception circuit according to claim 3, wherein the correction amount computation circuit adjusts the expectation value of the estimation result of the equalization circuit so that an error calculated by the equalization circuit, or the square value of the error is equal to or less than a threshold value.

5. The reception circuit according to claim 1, wherein the correction amount computation circuit creates the conversion table based on data of a frequency of appearance of all of the ADC output values in the output range of the AD converter more than a certain frequency.

6. The reception circuit according to claim 1, wherein the correction amount computation circuit estimates an output range that the ADC output value may take actually from an equalization coefficient calculated by the equalization circuit and the output range of the AD converter and creates the conversion table based on data of the frequency of appearance of all of the ADC output values in the output range more than the certain frequency.

7. The reception circuit according to claim 1, wherein the reception circuit further comprises a test voltage generation circuit that generates an analog test signal at an arbitrary level and inputs the output of the test voltage generation circuit to the AD converter.

8. A method of creating the conversion table in a circuit having an AD converter, a conversion table used to convert digital data output from the AD converter, and an equalization circuit, wherein
   the conversion table is created from the output data of the AD converter and the output of the equalization circuit.

9. The method according to claim 8, wherein the conversion table is created so that there is no dependence of the estimation result of the equalization circuit for the ADC output value of the AD converter.

10. A signal transfer system comprising:
    a transmission circuit that transmits a signal;
    a transfer line connected to the transmission circuit and through which the signal is transferred; and
    a reception circuit connected to the transfer line and which receives the transferred signal, wherein:
    the reception circuit comprises:
       an AD converter that converts the received signal into a multi-bit digital signal;
       a correction circuit that corrects nonlinearity of the AD converter; and
       an equalization circuit that equalizes the corrected digital data; and
    the correction circuit comprises:
       a conversion table used to convert digital data output from the AD converter; and
       a correction amount computation circuit that creates the conversion table from the output data of the AD converter and the output of the equalization circuit.

11. A reception circuit comprising:
    an AD converter;
    a correction part the corrects an output of the AD converter; and
    an equalization part that equalizes an output of the AD converter or an output of the correction part,
   wherein:
    the correction part corrects the output of the AD converter based on an amount of correction of a conversion table and outputs it to the equalization part; and
    in the conversion table, the amount of correction is stored, which is in accordance with an error between the output of the AD converter weighted by a certain weight in the equalization part and a determination value obtained by determining the output of the AD converter weighted by the certain weight based on a reference value.

12. The reception circuit according to claim 11, comprising a selection part that selects the output of the AD converter or the output of the correction part and outputs the output to the equalization part, wherein
    the selection part selects the output of the AD converter during a first determined period of time and selects the output of the correction part during a second certain period of time;
    in the conversion table, the amount of correction during the first certain period of time is stored; and the correction part corrects the output of the AD converter based on the conversion table in which the amount of correction during the first certain period of time is stored during the second certain period of time.

13. The reception circuit according to claim 12, comprising a control part that controls the outputs so that the output of the AD converter and the output of the correction part are selected alternately as the output of the selection part based on the first certain period of time and the second certain period of time.

* * * * *